United States Patent [19]

Kuwahara

[11] Patent Number: 4,650,289
[45] Date of Patent: Mar. 17, 1987

[54] OPTICAL CIRCULATOR

[75] Inventor: Hideo Kuwahara, Kawasaki, Japan

[73] Assignee: Fujitsu Limited, Kawasaki, Japan

[21] Appl. No.: 123,080

[22] Filed: Feb. 20, 1980

[30] Foreign Application Priority Data

Feb. 21, 1979 [JP] Japan ................. 54-20175[U]

[51] Int. Cl.$^4$ ................................ G02F 1/29
[52] U.S. Cl. .......................... 350/375; 350/400
[58] Field of Search ............ 350/150, 151, 157, 96.13, 350/96.14, 375, 376, 400, 401, 402; 333/1.1

[56] References Cited

U.S. PATENT DOCUMENTS

| | | | |
|---|---|---|---|
| 2,745,316 | 5/1956 | Sziklai | 350/150 |
| 2,867,772 | 1/1959 | Allen | 333/1.1 |
| 3,267,804 | 8/1966 | Dillon | 350/157 |
| 3,401,590 | 9/1968 | Massey | 350/150 |
| 4,153,328 | 5/1979 | Wang | 350/96.13 |
| 4,272,159 | 6/1981 | Matsumoto | 350/400 |

OTHER PUBLICATIONS

Jenkins et al., "Fundamentals of Optics", Third Edition, McGraw—Hill Book Company, Inc., 1957, p. 557.

Primary Examiner—R. A. Rosenberger
Attorney, Agent, or Firm—Staas & Halsey

[57] ABSTRACT

An optical circulator comprising a first optical path and a second optical path formed between a first polarizer prism and a second polarizer prism, faraday rotators interposed in the first and second optical paths, the polarizing direction of the Faraday rotators being rotated by an angle of 45° by a magnetic field and the direction of polarizing rotation being reversed with respect to the propagation direction of light which passes therethrough, and polarizing direction rotators interposed in the first and second optical paths, the polarizing direction of the polarizing direction rotators being rotated by an angle of 45° and the direction of polarizing rotation not being reversed with respect to the propagation direction of light which passes therethrough.

28 Claims, 23 Drawing Figures

OPTICAL CIRCULATOR

FIELD OF THE INVENTION

The present invention relates to an optical circulator and, more specifically, to an optical circulator which is suited for optical-fiber communications.

BACKGROUND OF THE INVENTION

A circulator has generally been employed in microwave communications systems, and it has been desired to employ an optical circulator also in communications systems using optical fibers. In communications systems using optical fibers, however, the plane of polarization is disturbed when the light propagates through the optical fibers, making it difficult to maintain a predetermined plane of polarization. The microwave circulator has been based upon a prerequisite that the plane of polarization of the electromagnetic waves be maintained constant. The optical circulator, however, cannot be formed with a construction similar to that of the microwave circulator.

OBJECTS AND SUMMARY OF THE INVENTION

The object of the present invention is to provide an optical circulator which is suited for communications systems using optical fibers, and which is not affected by the state of incident polarization.

According to the present invention, there is provided an optical circulator comprising a first optical path and a second optical path formed between a first polarizer element and a second polarizer element, Faraday rotators interposed in the first and second optical paths (the polarizing direction of the Faraday rotators being rotated by an angle of 45° by a magnetic field and the direction of polarizing rotation being reversed with respect to the propagation direction of light which passes therethrough,) and polarizing direction rotators interposed in the first and second optical paths (the polarizing direction of the polarizing direction rotators being rotated by an angle of 45° by the magnetic field, and the direction of polarizing rotation not being reversed with respect to the propagation direction of light which passes therethrough.)

Further features and advantages of the present invention will become apparent from the ensuing description with reference to the accompanying drawings to which, however, the scope of the invention is in no way limited.

DESCRIPTION OF THE PREFERRED EMBODIMENTS

Figure 1A:
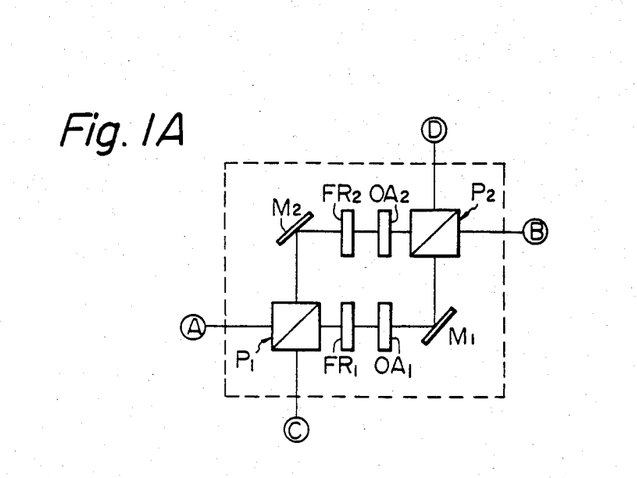
FIGS. 1A, 1B, and 1C are diagrams illustrating a construction of an optical circulator according to the present invention.

FIG. 1A illustrates an optical circulator according to an embodiment of the present invention. The optical circulator according to the invention consists of: a first polarizer prism $P_1$; a first Faraday rotator $FR_1$ and a first optically active substance $OA_1$, which are interposed in a first optical path of light produced from a first outlet port of the first polarizer prism $P_1$; a first mirror $M_1$ for reflecting the light travelling through the first optical path by an angle of 90°; a second mirror $M_2$ interposed in a second optical path of light produced from a second outlet port of the first polarizer prism; a second Faraday rotator $FR_2$ and a second optically active substance $OA_2$, which receive the light reflected by the second mirror $M_2$; and a polarizer prism $P_2$, which receives the light reflected by the first mirror $M_1$, and the light transmitted through the second Faraday rotator $FR_2$ and the second optically active substance $OA_2$. A port A is formed on an extension of the first optical path of the first polarizer prism, a port C is formed on an extension of the second optical path of the first polarizer prism, a port D is formed on an extension of the optical path which is reflected by the first mirror and which passes through the second polarizer prism, and a port B is formed on an extension of the optical axis of light which passes through the second optically active substance $OA_2$ and the second polarizer prism. The incident light input from the port A is transmitted to the port B, the incident light input from the port B is transmitted to the port C, the incident light input from the port C is transmitted to the port D, and the incident light input from the port D is transmitted to the port A.

Figure 1B:
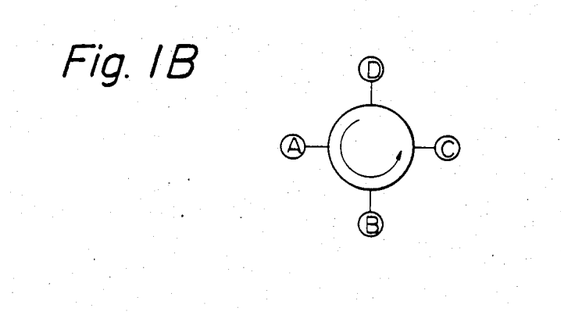
Figure 1C:
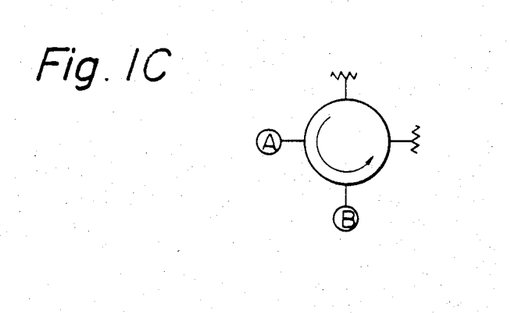

FIG. 1B illustrates the relation of inputs and outputs among the four ports of the optical circulator of FIG. 1A, and FIG. 1C illustrates the case when the optical circulator is used as an isolator by non-reflectively terminating the ports C and D of the optical circulator. Namely, the light is transmitted from the port A to the port B, but is not transmitted from the port B to the port A.

The foregoing description has dealt with the case in which Faraday rotators $FR_1$ and $FR_2$, optically active substances $OA_1$ and $OA_2$, and mirrors $M_1$ and $M_2$ are arranged between the polarizer prisms $P_1$ and $P_2$ in the order of $FR_1$-$OA_1$-$M_1$ and $M_2$-$FR_2$-$OA_2$. The order of arrangement, however, is not restricted to the above-mentioned order.

Figure 2A:
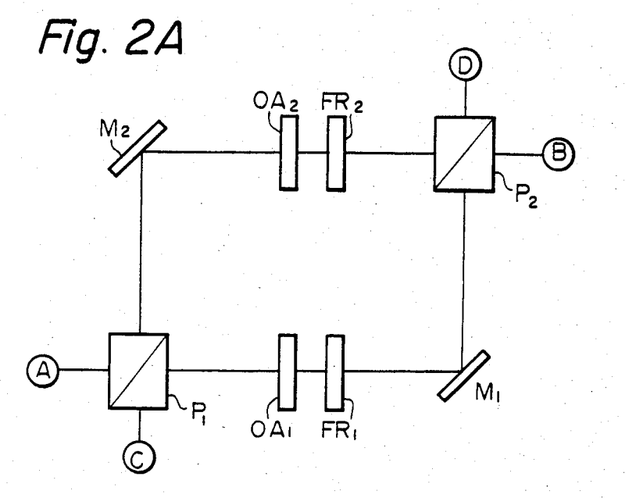
FIGS. 2A and 2B, and 2C are diagrams illustrating same variations in the embodiment of the optical circulator of FIG. 1A.
Figure 2B:
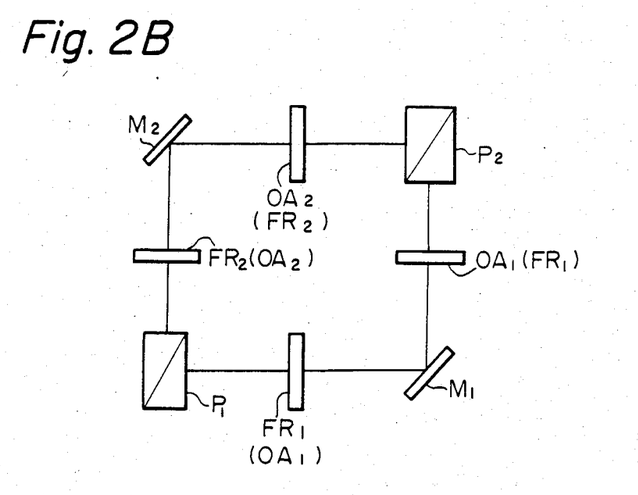
Figure 2C:
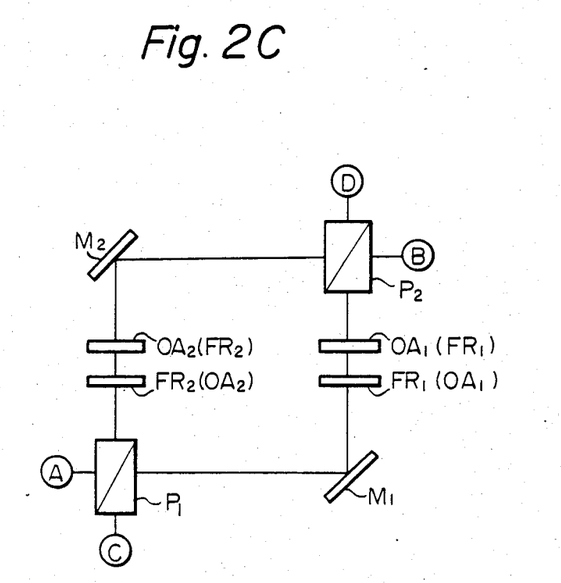

For example, as shown in FIGS. 2A, 2B, and 2C, the Faraday rotators and the optically active substances may be arranged in the incident side or the emit side of the mirrors, the order of the Faraday rotator and the optically active substance may be changed, and further the Faraday rotator and the optically active substance may be arranged separately in the incident side and the emit side of the mirrors.

In FIG. 2A the order of the Faraday rotator and the optically active substance in FIG. 1A is changed, in FIG. 2B the Faraday rotator and the optically active substance are arranged separately, and in FIG. 2C the position of the Faraday rotator and the optically active substance are shifted at right angles with respect to the position in FIG. 1A.

Figure 3:
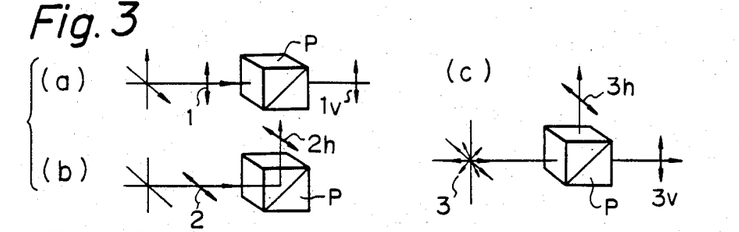
FIG. 3 illustrates a polarizer prism which is used for the optical circulator of FIG. 1A.

FIG. 3 illustrates the operation of the polarizer prisms $P_1$ and $P_2$. The polarizer prisms produce different outputs depending upon the direction of polarization. When the wave 1 is polarized in a vertical direction, as shown in the diagram (a), the polarizer prism transmits the light in the direction of the axis of incident light; when the wave 2 is polarized in a horizontal direction, as shown in the diagram (b), the polarizer prism transmits the light in a direction at right angles to the axis of incident light; and, when the light 3 is randomly polarized as shown in the diagram (c), the polarizer prism transmits the light partly in the direction of the axis of incident light and partly in the direction at right angles to the axis of incident light.

Figure 4:
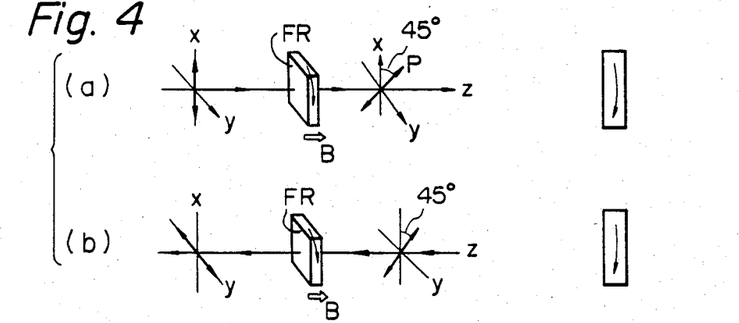
FIG. 4 illustrates the operation of a Faraday rotator which is used for the optical circulator of FIG. 1A.

FIG. 4 illustrates the operations of the Faraday rotators $FR_1$ and $FR_2$. The Faraday rotator is an element which is composed, for example, of yttrium-iron-garnet $Y_3Fe_5O_{12}$, and turns its polarizing direction by an angle of 45° depending upon the magnetic field. As shown in the diagrams (a) and (b) of FIG. 4, the rotating direction of polarization of the Faraday rotator changes when the travelling direction z of light is reversed. Thus, the light which has travelled in a round trip is polarized in a direction at right angles to the initial direction of polarization, as shown in the diagrams (a) and (b) of FIG. 4.

Figure 5:
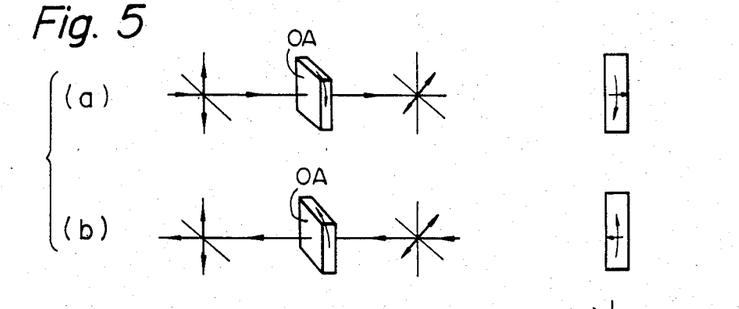
FIG. 5 illustrates the operation of an optically active substance which is used for the optical circulator of FIG. 1A.

FIG. 5 illustrates the operation of the optically active substance OA. A crystal is usually used as the optically active substance. The crystal has a polarizing surface which rotates. As will be obvious from the diagrams (a) and (b) of FIG. 5, the rotating direction of polarization is non-reversed with the reversal in the travelling direction of light. Thus, the light which has travelled in a round trip returns to the initial direction of polarization.

Figure 6:
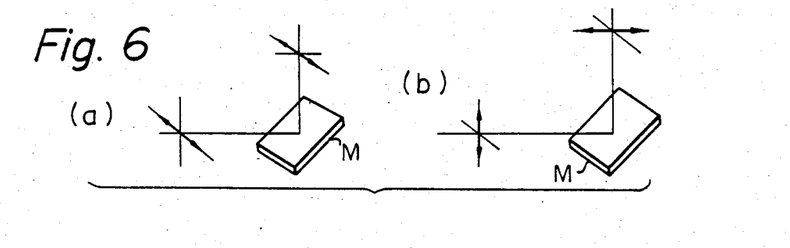
FIG. 6 illustrates the operation of a mirror which is used for the optical circulator of FIG. 1A.

FIG. 6 illustrates the operation of mirrors $M_1$ and $M_2$. Diagrams (a) and (b) of FIG. 6 show total reflection mirrors M, which are capable of changing the direction of optical path while maintaining the direction of polarization.

Figures 7A, 7B:
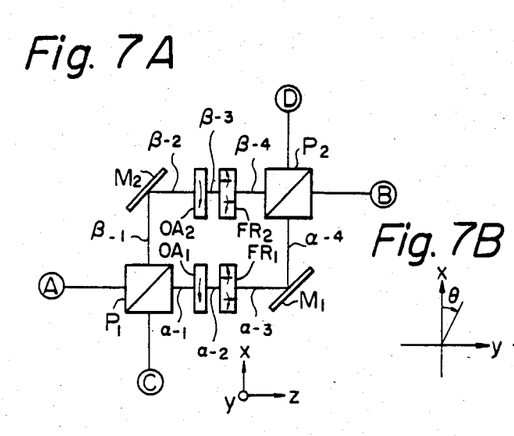
FIGS. 7A, 7B, and 7C illustrate the operation of the optical circulator of FIG. 1A.
Figure 7C:
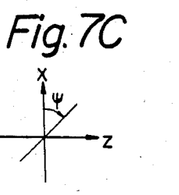

Operation of the optical circulator of the present invention is described below with reference to FIGS. 7A, 7B, and 7C. For the purpose of convenient illustration in FIG. 7A, the two optical paths are denoted by $\alpha$ and $\beta$, and portions of the optical paths are denoted by 1, 2, 3, and 4. Directions of polarization are denoted by $\theta$ and $\psi$ as inclinations with respect to the axes x, y, and z. In FIG. 7B, symbol $\theta$ denotes an inclination in a plane x-y, and in FIG. 7C, symbol $\psi$ denotes an inclination in a plane x-z.

(A) First, the light incident through the port A is taken into consideration, and it is presumed that the light which has passed through optical fibers and is polarized in a random fashion is received.

With reference to the light incident upon the port A, the component ($\theta=0°$, $\psi=0°$) which is polarized in the direction x is transmitted toward the optical path $\alpha$ by the polarizing prism $P_1$ and the component ($\theta=90°$, $\psi=0°$) which is polarized in the direction y is reflected toward optical path $\beta$. The polarized states at the individual points in each of the optical paths are shown in Table 1a and Table 1b.

TABLE 1a

| | Component x ($\theta = 0°$, $\psi = 0°$) | |
| --- | --- | --- |
| | Polarized state | |
| Points | $\theta(°)$ | $\psi(°)$ |
| $\alpha$-1 | 0 | 0 |
| $\alpha$-2 | 45 | 0 |
| $\alpha$-3 | 90 | 0 |
| $\alpha$-4 | 90 | 0 |

TABLE 1b

| | Component y ($\theta = 90°$, $\psi = 0°$) | |
| --- | --- | --- |
| | Polarized state | |
| Points | $\theta$ | $\psi$ |
| $\beta$-1 | 90 | 0 |
| $\beta$-2 | 90 | 0 |
| $\beta$-3 | 135 | 0 |
| $\beta$-4 | 180(= 0) | 0 |

The light at the point $\alpha$-4 of Table 1a is reflected to the port B via the polarizer prism $P_2$, and the light at the point $\beta$-4 of Table 1b is transmitted to the port B via the polarizer prism $P_2$. Therefore, the light incident through the port A is divided into optical paths $\alpha$ and $\beta$ depending upon the polarized components, synthesized together by the polarizer prism $P_2$, and is emitted through the port B.

(B) Similarly, the light introduced through the port B is divided into a component x and a component y by the polarizer prism $P_2$. The polarizer states at the individual points in each of the optical paths are shown in Tables 2a and 2b.

TABLE 2a

| | Component x ($\theta = 0°$, $\psi = 0°$) | |
| --- | --- | --- |
| | Polarized state | |
| Points | $\theta$ | $\psi$ |
| $\beta$-4 | 0 | 0 |
| $\beta$-3 | −45 | 0 |
| $\beta$-2 | 0 | 0 |
| $\beta$-1 | 90 | 90 |

TABLE 2b

| | Component y ($\theta = 90°$, $\psi = 0°$) | |
| --- | --- | --- |
| | Polarized state | |
| Points | $\theta$ | $\psi$ |
| $\alpha$-4 | 90 | 0 |
| $\alpha$-3 | 90 | 0 |
| $\alpha$-2 | 45 | 0 |
| $\alpha$-1 | 90 | 0 |

The light at point $\beta$-1 of Table 2a is transmitted to the port C through the polarizer prism $P_1$, and the light at point $\alpha$-1 of Table 2b is reflected to the port C through the polarizer prism $p_1$. Therefore, the light introduced through the port B is divided into optical paths $\alpha$ and $\beta$ depending upon the polarized components, synthesized together through the polarizer prism $P_1$, and is emitted to the port C.

(C) Similarly, the light introduced through the port C is divided into a component y and a component z by the polarizer prism $P_1$. The polarized states at the individual points in each of the optical paths are shown in Tables 3a and 3b.

TABLE 3a

| Points | Component y ($\theta = 90°$, $\psi = 0°$) Polarized state | |
|---|---|---|
| | $\theta$ | $\psi$ |
| α-1 | 90 | 0 |
| α-2 | 135 | 0 |
| α-3 | 180(= 0) | 0 |
| α-4 | 180(= 0) | 90 |

TABLE 3b

| Points | Component z ($\theta = 0°$, $\psi = 90°$) Polarized state | |
|---|---|---|
| | $\theta$ | $\psi$ |
| β-1 | 0 | 90 |
| β-2 | 0 | 0 |
| β-3 | 45 | 0 |
| β-4 | 90 | 0 |

The light at point α-4 of Table 3a is transmitted to the port D through the polarizer prism $P_2$, and the light at point β-4 of Table 3b is reflected to the port D through the polarizer prism $P_2$. Therefore, the light introduced through the port C is divided into optical paths α and β depending upon the polarized components, synthesized together by the polarizer prism $P_2$, and is emitted to the port D.

(D) Similarly, the light introduced through the port D is divided into a component y and a component z by the polarizer prism $P_2$. The polarized states at the individual points in each of the optical paths are as shown in Tables 4a and 4b.

TABLE 4a

| Points | Component y ($\theta = 90°$, $\psi = 0°$) Polarized state | |
|---|---|---|
| | $\theta$ | $\psi$ |
| β-4 | 90 | 0 |
| β-3 | 45 | 0 |
| β-2 | 90 | 0 |
| β-1 | 90 | 0 |

TABLE 4b

| Points | Component z ($\theta = 0°$, $\psi = 90°$) Polarized state | |
|---|---|---|
| | $\theta$ | $\psi$ |
| α-4 | 0 | 90 |
| α-3 | 0 | 0 |
| α-2 | −45 | 0 |
| α-1 | 0 | 0 |

The light at point β-1 of Table 4a is reflected to the port A via the polarizer prism $P_1$, and the light at point α-1 of Table 4b is transmitted to the port A via the polarizer prism $P_1$. Therefore, the light introduced through the port D is divided into optical paths α and β depending upon the polarized components, synthesized together through the polarizer prism $P_1$, and is emitted to the port A.

According to the present invention, as mentioned above, a circulator having four ports, i.e., A→B, B→C, C→D, D→A, can be constituted. Furthermore, the incident light through each of the ports need not be linearly polarized waves. In other words, the circulator of the invention can be used even for light which has passed through the optical fibers in which the polarized state is disturbed.

The circulator according to the present invention can be used as an isolator. For example, if the ports C and D are composed of anti-reflection terminals, the light can be transmitted between the neighbouring two ports, i.e., from the port A to the port B and not from the port B to the port A. Further, if the port B is a total reflection terminal and the port D is an anti-reflection terminal, an isolator can be constituted with the ports A and C. Even when the optical circulator is used as an isolator, it is not affected by the state of incident polarization.

When it is desired to use the circulator of the present invention as a three-port circulator, the port D, for instance, should be replaced with a total reflection terminal. Therefore, the three-port circulator which has light travelling directions of A→B, B→C, C→D→A can be obtained.

Figure 8:
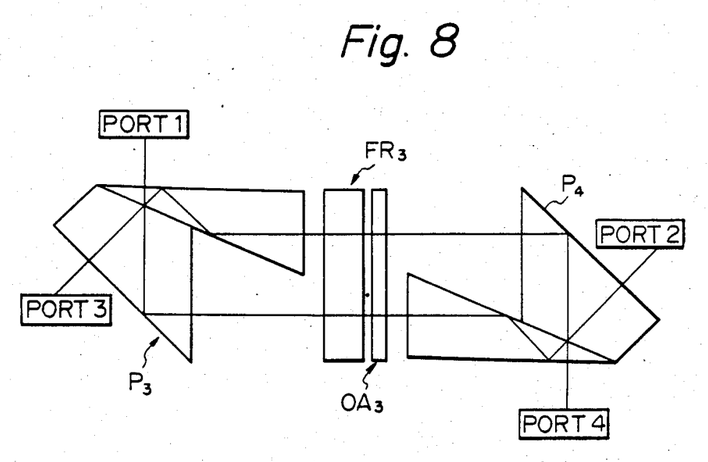
FIG. 8 illustrates an optical circulator according to another embodiment of the present invention.

FIG. 8 illustrates an optical circulator according to another embodiment of the present invention. The embodiment of FIG. 8 relates to the optical circulator which is based upon the principle of the optical circulator of FIG. 1A, but which is constructed in a more compact size requiring fewer parts. The circulator of FIG. 8 consists of a YIG ($Y_3Fe_5O_{12}$) crystal which serves as a Faraday rotator $FR_3$, a crystal plate $OA_3$ used as a half-wave plate, and two polarizers $P_3$ and $P_4$ made up of two prisms. The incident light beam is divided into two parallel beams by the polarizer. The parallel beams have polarized planes that are at right angles to each other. The two parallel beams pass through the Faraday rotator $FR_3$ and the half-wave plate $OA_3$, and are emitted through another polarizer. Each component is coated with an anti-reflection coating.

The polarizer prisms $P_3$ and $P_4$ are described below in detail with reference to FIGS. 9A and 9B.

Figure 9A:
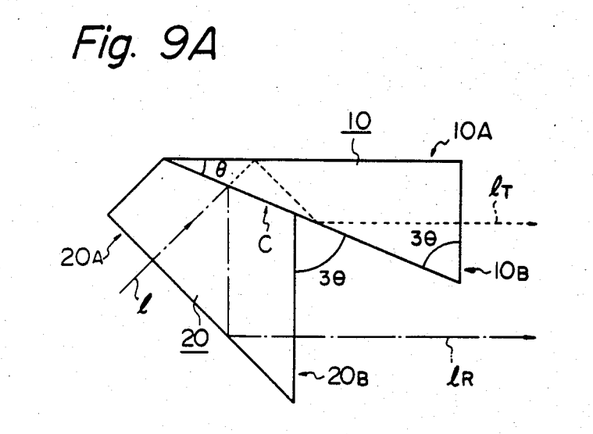
FIGS. 9A and 9B illustrate a representative example of the optical prism employed in the optical circulator of FIG. 8.

In FIG. 9A, reference numerals 10 and 20 denote a prism having a triangular cross-section and a prism having a quadrangular cross-section, which are composed of titanium dioxide. The optical axes of these prisms 10 and 20 are perpendicular to the surface of the paper. Symbol C denotes a region in which the prisms 10 and 20 are facing each other. An air layer of a thickness as small as, for example, about 10 microns is present in the region C. Reference numerals 10A and 10B denote a plane of the prism 10 for introducing and emitting the light, and a plane for totally reflecting the light, and reference numerals 20A and 20B denote a plane of the prism 20 for introducing and emitting the light, and a plane for totally reflecting the light.

The polarizer prism has a shape as described below. First, with the plane C as a reference, the plane 10A is so formed as to cross the plane C maintaining a Brewster's angle $\theta$ which is determined by an ordinary ray heading from the interior of the prism toward the external side, and the plane 20A is also so formed as to cross the plane C maintaining the same angle $\theta$. In this case, the titanium dioxide exhibits a refractive index $n_o$ of 2.46 for an ordinary ray (light beam for which the optical axis and the polarized plane cross at right angles) at a wavelength of 1.3 microns, and exhibits a refractive index $n_e$ of 2.72 for an extraordinary ray (light beam for which the optical aixs and the polarized plane are in parallel) at a wavelength of 1.3 microns. From the refractive index $n_o$ by the ordinary ray, the Brewster's angle $\theta$ can be found according to the following relation.

$$\theta \approx \text{arccot } n_o \approx 22.1°$$

The reason the planes 10A and 20A are formed maintaining the above-mentioned angle θ is because, when the non-polarized light l (natural light, or linearly polarized light having a polarized plane which is tilted, or elliptically polarized light) containing both the ordinary ray components $l_T$ and the extraordinary ray components $l_R$ is permitted to be perpendicularly incident upon the planes 10A and 20A and is allowed to reach the plane C along a single path, the incident angle with respect to the plane C defines the Brewster's angle.

On the other hand, the planes 10B and 20B are in parallel with each other, and they meet at right angles with light rays $l_T$ and $l_R$, which are emitted from the interior of the prism to the exterior. In the case of FIG. 9A, the planes 10B and 20B are so defined as to have an angle 30=66.3° with the plane C.

With the above-mentioned construction, non-polarized light l which falls on the prism 20 perpendicularly to the plane 20A (the same holds true with the plane 10A) is allowed to be incident upon the plane C at the Brewster's angle. Therefore, the ordinary ray $l_T$ contained in the non-polarized light ray l completely passes through the plane C. However, the extraordinary ray $l_R$ which satisfies the requirement of total reflection, i.e., $n_e \sin \theta \approx 1.02 > 1$, contained in the non-polarized ray l, is completely reflected.

In effect, light components are completely polarized and separated from the natural light l. In the case of a prism composed of a calcite, part of the polarized light that should have been reflected is permitted to pass through. The prism composed of titanium dioxide, however, does not present such an inconvenience.

If there is any substance which statisfies the requirements set forth below, it may be used in place of the titanium dioxide. Namely, the following relations should be satisfied with regard to refractive index $n_o$ for the ordinary ray, refractive index $n_e$ for the extraordinary ray, and the Brewster's angle θ for the ordinary ray.

$$n_e \sin \theta > 1 \quad (1)$$

$$\cot \theta = n_e \quad (2)$$

From (1), $n_e^2 > \csc^2 \theta$ \quad (1)'

From (2), $n_o^2 = \cot^2 \theta$ \quad (2)'

From (1)'−(2)', $n_e^2 - n_o^2 > 1$ \quad (3)

From the above mentioned relations, it will be recognized that thee square difference in the index or double refraction must be greater than 1.

In the case of titanium dioxide, the difference will be $n_e^2 - n_o^2 = 1.35$ at a wavelength of 1.3 microns.

Figure 10:
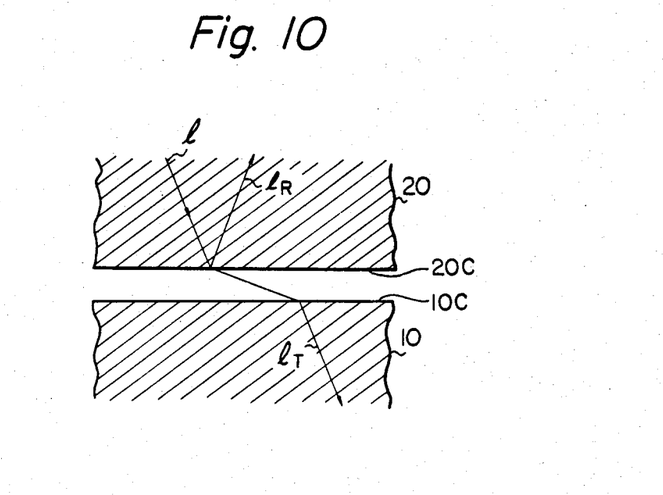
FIG. 10 illustrates the principle of the polarizer prism of FIG. 9A.

The polarized and separated ordinary ray $l_T$ then proceeds into another prism 10 through the thin gap pores present in the plane C, and is eventually oriented in the same direction as the incident light l. More specifically, the ray is refracted and polarized once through the boundary between the prism 20 and the thin gap, as shown in FIG. 10, and is refracted and polarized again through the boundary between the thin gap, and the prism 10. The Brewster's angle is maintained even by the second refraction. Polarization by the second refraction causes the direction of the light ray to bend in the opposite direction. Consequently, the incident light l and the ordinary ray $l_T$ proceed in parallel. When the thickness of thin gap is denoted by t, the distance x between the two rays is given by x=t·sin (90°−2θ)/sin θ (wherein θ represents the Brewster's angle 22.1°). Therefore, when t=10 microns, x is 19 microns, which in practice is negligibly small.

Referring again to FIG. 9A, the thus separated ordinary ray $l_T$ and extraordinary ray $l_R$, which proceed through the prisms 10 and 20, are totally reflected in each of the prisms. The direction of the ordinary ray $l_T$ after it is reflected by the plane 10A and the plane C, is in agreement and is in parallel with the direction of the extraordinary ray $l_R$ which is reflected by the plane 20A. This can be easily understood if it is considered that the ordinary ray $l_T$ and the extraordinary ray $l_R$ are separated toward directions which are symmetrical with respect to a line in the plane C, and are totally relected by the planes 10A and 20A which are arrayed defining symmetrical angles.

In other words, the ordinary ray $l_T$ and the extraordinary ray $l_R$ after being reflected the same number of times (one time each), are so oriented as to define symmetrical angles with respect to the plane C. Furthermore, the ordinary ray $l_T$ is reoriented by the second reflection symmetrically with respect to the plane C. Consequently, the extraordinary ray $l_R$ which is reflected once and the ordinary ray $l_T$ which is reflected twice become parallel with each other. The ordinary ray $l_T$ and the extraordinary ray $l_R$, which are parallel, are allowed to perpendicularly pass through the planes 10B and 20B, and are emitted to the exterior of the prisms 10 and 20.

Thus, the polarizer prism illustrated in FIG. 9A permits the ordinary ray $l_T$ and the extraordinary ray $l_R$ to be emitted in parallel. By using such a polarizer prism, therefore, it is possible to provide an optical circulator which is constructed in a compact size requiring fewer parts.

Figure 9B:
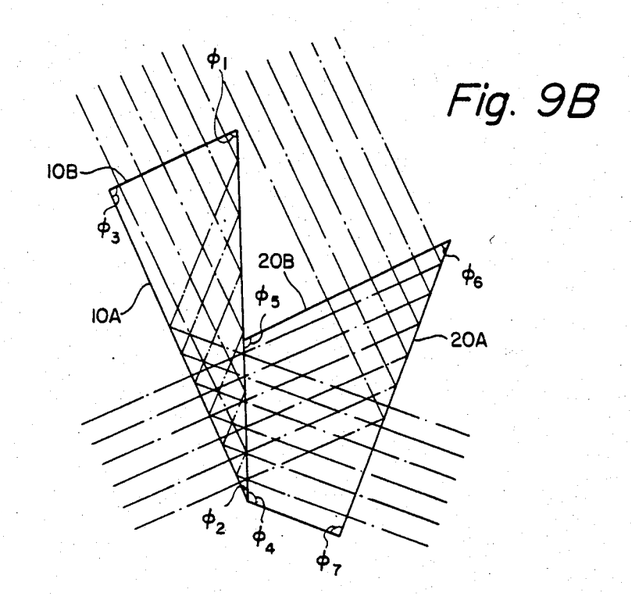

For easy understanding of the prism which is constructed in a compact size, FIG. 9B illustrates paths of rays in the prism as well as widths of the paths. Angles in the prism are:

$\phi_1 = 66.29°$; $\phi_2 = 22.10°$; $\phi_3 = 91.61°$
$\phi_4 = 112.10°$; $\phi_5 = 113.71°$; $\phi_6 = 44.19°$
$\phi_7 = 90°$ As can be seen FIG. 9B, the space in the prism is effectively used with respect to the width of light flux. It will further be recognized that the two parallel light rays can be brought close to each other. For example, a crystal $FR_3$ grown by the flux method is polished so as to provide 45° Faraday rotation at a wavelength of 1.3 microns. The thickness of the YIG crystal $FR_3$ is about 2.1 mm. Transmissivity of the antireflection coated crystal is about 90% at 1.3 microns. In order to saturate the YIG crystal $FR_3$, a magnetic field is applied by a ring shaped samarium-cobalt(Sm-Co) magnet. The half-wave plate $OA_3$ is used to obtain 45° polarization rotation. The principal axis of the quartz is arranged at 22.5° to the incident polarization. The transmissivity of the half-wave plate is over 99%.

The light travelling to the right undergoes 45° rotation by the YIG crystal and −45° rotation by the quartz plate, cancelling polarization rotation. The light travelling to the left, on the other hand, undergoes 90° rotation by the YIG crystal and the quartz plate. The size of the optical circulator shown in FIG. 9A is about 1.7 cm×1.5 cm×1.5 cm, and this size is determined mainly by the magnet. For convenience in actual use, each port is arranged in a flat configuration with ample space to attach a lens or fiber connector.

One example of measured transmission loss (dB) of the circulator is summarized in Table 5.

TABLE 5

| IN | OUT | | | |
|---|---|---|---|---|
| | 1 | 2 | 3 | 4 |
| 1 | — | 1.1 | 18 | 22 |
| 2 | 17 | — | 0.9 | 17 |
| 3 | 23 | 18 | — | 1.1 |
| 4 | 0.9 | 16 | 17 | — |

A few examples of applications of the circulator of the present invention are mentioned below.

Figure 11A:
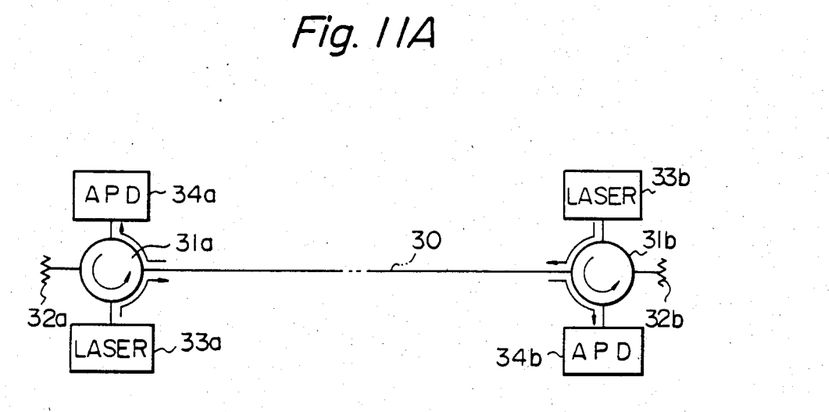
FIGS. 11A and 11B illustrate some applications of the optical circulator of the present invention.
Figure 11B:
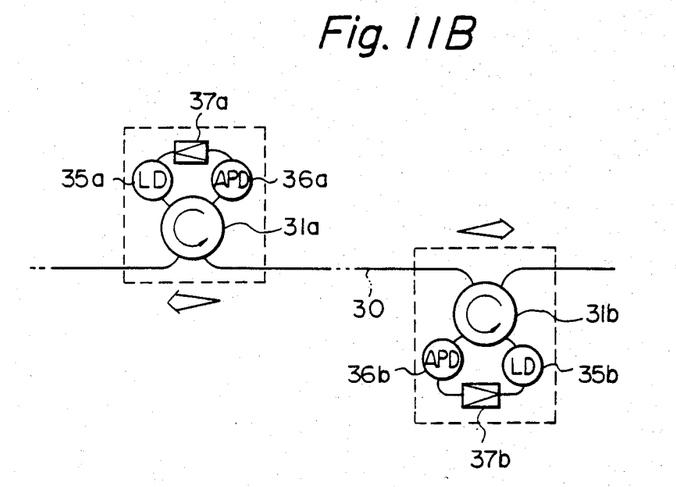

FIGS. 11A and 11B illustrate the cases in which the circulator of the present invention is employed for bilateral communications systems of the same wavelengths. In these cases, the functions of the existing fibers can be doubled. FIG. 11A shows the case in which the light is transmitted between the transmitting end and the receiving end of a fiber 30, and in which reference numerals 31a and 31b denote circulators according to the present invention, and 32a and 32b denote anti-reflection terminals. Optical information from a laser 33a travels through optical circulator 31a, fiber 30 and optical circulator 31b, and is received by an avalanche photodiode (APD) 34b. Optical information from a laser 33b travels through optical circulator 31b, fiber 30, and optical circulator 31a, and is received by an avalanche photodiode (APD) 34a. FIG. 11B shows the case when the optical circulators are used as bilateral repeaters. The light propagating from the left toward the right is admitted through a first port of the optical circulator 31a, is amplified through the optical circulator 31b, avalanche photodiode (APD) 36b, amplifier 37b and laser diode (LD) 35b, and is emitted through another port of the optical circulator 31b. The light propagating from the right toward the left is admitted through a first port of the optical circulator 31b, is amplified through the optical circulator 31a, avalanche diode (APD) 36a, amplifier 37a and laser diode (LD) 35a, and is emitted through another port of the optical circulator 31a.

Figure 12:
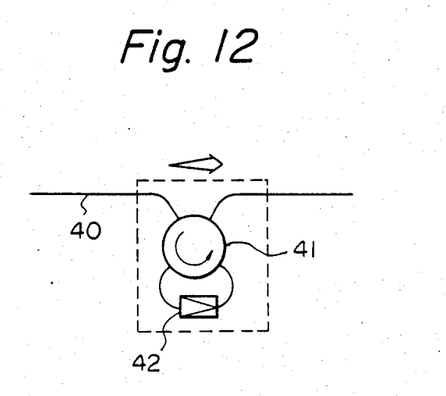
FIG. 12 illustrates another application of the optical circulator of the present invention.
Figure 13:
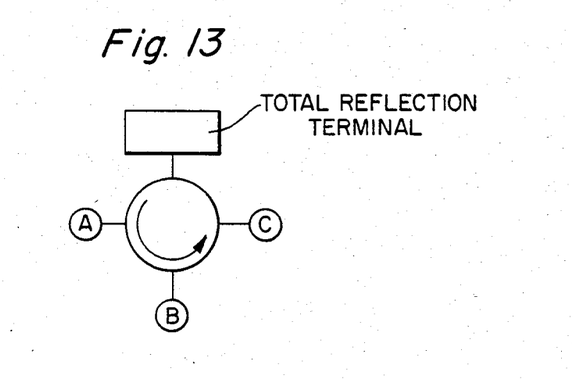
FIG. 13 illustrates an optical circulator of the present invention connected as a 3 port circulator.

FIG. 12 illustrates the case in which the circulator of the present invention is used for a unilateral optical amplification system, in order to give directivity to an optical amplifier which is based upon a semiconductor laser or the like. Namely, the light transmitted from the left toward the right passes through an optical circulator 41, whereby an optical amplifier 42 exhibits a gain. The light travelling in the reverse direction, passes through the circulator 41 while suffering insertion loss.

As illustrated in detail in the foregoing, the present invention provides an optical circulator which is not affected by the polarized state of the incident light, and which permits distinctive effects when it is applied to communication systems using optical fibers.

What is claimed is:

1. An optical circulator unaffected by the polarization state of input light comprising:
   first and second polarizer elements;
   means for forming a first optical path and a second optical path between said first polarizer element and said second polarizer element;
   means for applying a magnetic field to said optical paths;
   Faraday rotators interposed in said first and second optical paths within said magnetic field, and having a polarizing direction rotated by an angle of 45° by said magnetic field, whereby the direction of polarizing rotation is reversed selectively with respect to the propagation direction of light which passes therethrough; and
   polarizing direction rotators interposed in said first and second optical paths and having a polarizing direction rotated by an angle of 45°, whereby the direction of polarizing rotation is not reversed selectively with respect to the propagation direction of light which passes therethrough.

2. An optical circulator according to claim 1, wherein said polarizing direction rotators comprise an optically active substance.

3. An optical circulator according to claim 1, wherein said polarizing direction rotators comprise half-wave plates.

4. An optical circulator unaffected by the polarization state of input light comprising:
   a first polarizer element and a second polarizer element having inlet ports and outlet ports which change depending upon the polarization direction of light incident upon said inlet ports;
   a first mirror and a second mirror for forming a first optical path and a second optical path between said first polarizer element and said second polarizer element;
   means for applying a magnetic field to said optical paths;
   first and second Faraday rotators which are interposed respectively in said first and second optical paths, and which cause the direction of polarization to be rotated by an angle of 45° under said magnetic field, whereby the rotation of the direction of polarization is reversed when the propagation direction of light is reversed; and
   first and second optically active substances which are interposed respectively in said first and second optical paths, and which cause the polarizing direction to be rotated, whereby the rotation of the direction of polarization is not reversed when the propagation direction of light is reversed.

5. The device of claim 4, further comprising:
   a reflector operatively connected to one of said ports of said circulator, so that said circulator functions as a three-port circulator.

6. The device of claim 4 operatively connected to isolate a transmitting and receiving means which are simultaneously operatively connected to a single optical fiber termination, further comprising:
   operatively adjacent ports; and
   a non-reflective terminating element operatively connected to one of said ports of said circulator.

7. A system comprising two devices according to claim 6, and further comprising:
   an optical fiber operatively connected to the one port in each of the two systems which is not operatively adjacent to said nonreflective terminating element.

8. The device of claim 4, further comprising:
   two non-reflective terminating elements operatively connected to a first port of said optical circulator and to a second port which is operatively adjacent to said first port, so that said circulator functions as an isolator.

9. The device of claim 4, further comprises:
   operatively adjacent ports; and
   an optical amplifier operatively connected between adjacent first and second ports of said circulator, so that signals received at a third port of said circulator are passively transmitted through a fourth port thereof and signals received at said fourth port are transmitted with amplification through said third port thereof.

10. The device of claim 4, further comprising:
operatively adjacent ports;
means, optically operatively connected to a first port of said circulator, for receiving optical signals;
means for amplifying, operatively connected to the output of said receiving means; and
means, operatively connected to the output of said amplifying means and optically operatively connected to a second port of said circulator which is adjacent to said first port, for transmitting optical signals to said circulator, so that the system functions as a directionally selective optical repeater.

11. An optical circulator unaffected by the polarization state of input light, comprising:
first and second means, each having first and second outputs and first and second inputs, for selectively transmitting light received at one of said first and second inputs to at least one of said first and second outputs in accordance with the polarization state of the light received, and for selectively transmitting light received at one of said first and second outputs to at least one of said first and second inputs in accordance with the polarization state of the light received; said first and second means being oriented so that a first bidirectional optical path is formed between said first output of said first means and said second output of said second means, and a second bidirectional optical path is formed between said first output of said second means and said second output of said first means;
third and fourth means, interposed respectively in said first and second optical paths, for rotating the direction of polarization of light passing through said third or said fourth means by 45°, said rotation being applied in a direction which (viewed with respect to the propagation direction of said light passing therethrough) is selectively reversed with respect to opposite propagation directions of said light;
fifth and sixth means, interposed respectively in said first and second optical paths, for rotating the direction of light passing through said fifth or sixth means by 45°, said rotation being applied in a direction which (viewed with respect to the propagation direction of said light passing therethrough) is constant with respect to opposite propagation directions of light, whereby the optical circulator, unaffected by the polarization state of the input light, is formed.

12. The device of claim 11, wherein said first and second means each comprise:
a polarizer prism.

13. The device of claim 12, wherein said fifth and sixth means each comprise:
a plate comprising an optically active substance.

14. The device of claim 13, wherein said third and fourth means each comprise:
a Faraday rotator.

15. The device of claim 14, wherein said plate is a half-wave plate.

16. The device of claim 15, wherein said plate comprises quartz.

17. The device of claim 14, wherein said plate comprises quartz.

18. The device of claim 14, wherein said Faraday rotator comprises YIG (Yttrium Iron Garnet).

19. The device of claim 18, wherein said Faraday rotator further comprises a magnet.

20. The device of claim 19, wherein said magnet comprises a ring magnet.

21. The device of claim 20, wherein said magnet comprises Samarium Cobalt.

22. The optical circulator of claim 1, 4, or 11, wherein said first optical path and said second optical path are bidirectional.

23. The optical circulator of claim 1, 11, 14, or 18, having 4 ports, in combination with:
a reflector operatively connected to one of said ports of said circulator,
so that said circulator functions as a three-port circulator.

24. The optical circulator of claim 1, 11, 14, or 18, having 4 ports, for mutual isolation of transmitting means and receiving means which are simultaneously operatively connected to a single end of a single optical fiber, in combination with:
a non-reflective terminating element operatively connected to one of said ports of said circulator.

25. The optical circulator of claim 1, 11, 14, or 18, having 4 ports, in combination with:
two non-reflective terminating elements operatively connected to a first port of said optical circulator and to a second port which is operatively adjacent to said first port,
so that said circulator functions as an isolator.

26. The optical circulator of claim 1, 11, 14, or 18, having 4 ports, in combination with:
an optical amplifier operatively connected between adjacent first and second ports of said circulator,
so that signals received at a third port of said circulator are passively transmitted through a fourth port thereof and signals received at said fourth port are transmitted with amplification through said third port thereof.

27. The optical circulator of claim 1, 11, 14, or 18, having 4 ports, in combination with:
means, optically operatively connected to a first port of said circulator, for receiving optical signals;
means for amplifying, operatively connected to the output of said receiving means; and
means, operatively connected to the output of said amplifying means and optically operatively connected to a second port of said circulator which is adjacent to said first port, for transmitting optical signals to said circulator,
so that the system functions as a directionally selective optical repeater.

28. First and second optical circulators, both according to claim 1, 11, 14, or 18, each circulator having 4 ports, in combination with:
first and second reflectors operatively connected to a first port of said four ports of said first circulator and to a first port of said four ports of said second circulator respectively; and
an optical fiber having first and second ends;
said first end being operatively connected to a second port of said four ports of said first circulator which is not operatively adjacent to said first port of said first circulator, and
said second end being operatively connected to a second port of said four ports of said second circulator which is not operatively adjacent to said first port of said second circulator.

* * * * *

UNITED STATES PATENT AND TRADEMARK OFFICE
CERTIFICATE OF CORRECTION

PATENT NO. : 4,650,289

DATED : March 17, 1987

INVENTOR(S) : Kuwahara

It is certified that error appears in the above-identified patent and that said Letters Patent is hereby corrected as shown below:

Front Page, [57] Abstract, line 3, "faraday" should be --Faraday--.
Column 1, line 57, "2A and" should be --2A,--.
Column 3, line 21, "and;" should be --and--;
        line 22, "ized" should be --ized,--;
        line 43, delete "the".
Column 4, line 59, "$p_1$." should be --$P_1$.--.
Column 6, line 62, "aixs" should be --axis--.
Column 7, lines 3, 6, 7, 13, 18, 21, 22, 23, 25, 26, 29, 56, 59 and 68, change all occurrences of "l" to --$\ell$--.
Column 8, lines 7, 9, 12, 14, 19, 20, 24, 26, 27, 29 and 33, change all occurrences of "l" to --$\ell$--.
Column 9, line 50, "direction," should be --direction--.
Column 10, line 65, "comprises:" should be --comprising:--.

Signed and Sealed this

Eighteenth Day of August, 1987

*Attest:*

DONALD J. QUIGG

*Attesting Officer*     Commissioner of Patents and Trademarks